(12) United States Patent
Strandberg et al.

(10) Patent No.: US 6,895,654 B2
(45) Date of Patent: May 24, 2005

(54) APPARATUS AND METHOD FOR ATTACHING A COMPONENT TO A FIBER

(75) Inventors: Steven M. Strandberg, Holden, MA (US); Taric M. Kabir, Medford, MA (US); John C. Alden, Londonderry, NH (US)

(73) Assignee: kSARIA Corporation, Wilmington, MA (US)

( * ) Notice: Subject to any disclaimer, the term of this patent is extended or adjusted under 35 U.S.C. 154(b) by 104 days.

(21) Appl. No.: 09/900,840

(22) Filed: Jul. 6, 2001

(65) Prior Publication Data

US 2003/0009869 A1 Jan. 16, 2003

(51) Int. Cl.[7] .............................................. B23P 23/00
(52) U.S. Cl. ...................... 29/564.1; 29/33 F; 29/564; 29/747; 29/748; 29/752; 385/49; 385/52; 385/76; 385/78
(58) Field of Search ................................ 29/33 F, 564, 29/564.1, 747, 748, 752, 845; 385/49, 52, 76, 78

(56) References Cited

U.S. PATENT DOCUMENTS

| | | | |
|---|---|---|---|
| 3,456,324 A | 7/1969 | Hahn et al. | |
| 3,686,752 A | 8/1972 | Hammond | |
| 3,768,143 A | 10/1973 | Holmes, Jr. | |
| 3,875,662 A | 4/1975 | Folk | |
| 3,909,900 A | 10/1975 | Gudmestad | |
| 4,440,053 A | * 4/1984 | Suzuki et al. | |
| 4,531,702 A | 7/1985 | Plummer | |
| 4,916,811 A | * 4/1990 | Uehara et al. | |
| 5,159,655 A | 10/1992 | Ziebol et al. | |
| 5,168,617 A | 12/1992 | Tsuchida et al. | |
| 5,179,608 A | 1/1993 | Ziebol et al. | |
| 5,208,977 A | * 5/1993 | Ricard | |
| 5,214,732 A | 5/1993 | Beard et al. | |
| 5,239,604 A | 8/1993 | Ziebol et al. | |
| 5,261,019 A | 11/1993 | Beard et al. | |
| 5,293,582 A | 3/1994 | Beard et al. | |
| 5,351,334 A | 9/1994 | Chun et al. | |
| 5,381,497 A | 1/1995 | Toland et al. | |
| 5,386,488 A | 1/1995 | Oikawa | |
| 5,587,116 A | 12/1996 | Johnson et al. | |
| 5,770,001 A | * 6/1998 | Nagayama et al. | |
| 5,815,619 A | * 9/1998 | Bloom | |
| 5,926,594 A | * 7/1999 | Sung et al. | |
| 5,970,749 A | 10/1999 | Bloom | |
| 6,003,341 A | 12/1999 | Bloom | |
| 6,122,936 A | 9/2000 | Csipkes et al. | |
| 6,237,370 B1 | 5/2001 | Bloom | |

* cited by examiner

*Primary Examiner*—Carl J. Arbes
(74) *Attorney, Agent, or Firm*—Wolf, Greenfield & Sacks, P.C.

(57) ABSTRACT

An automatic apparatus and method for attaching a ferrule to a fiber, such as an optical fiber. The apparatus may include a ferrule supply, a ferrule support, an adhesive dispenser and a fiber support. Components may be computer controlled and the method may provide for automatic attachment of a ferrule to an optical fiber.

61 Claims, 16 Drawing Sheets

APPARATUS AND METHOD FOR ATTACHING A COMPONENT TO A FIBER

FIELD OF THE INVENTION

The present invention relates to an apparatus and to a method, for automatically attaching a component, such as a ferrule, to a fiber, such as an optical fiber.

DESCRIPTION OF THE RELATED ART

To facilitate connection of an optical fiber to an optical device, or to another optical fiber, at least one end of the optical fiber may be provided with a connector or a plug that is commonly referred to as a "ferrule". A coiled length of optical fiber that has both ends terminating in a ferrule is referred to as a "pigtail". A circuit designer may employ one or more pigtails to interconnect optical components to create a desired circuit.

Connection of a ferrule to a fiber end typically is performed manually. A length of fiber is unwound from a large spool of fiber and then cut. The fiber is coiled and secured by wrapping a tie around the fiber windings. The insulation or outer sheath at an end section of the fiber is cut and then stripped away, leaving an exposed fiber end where the ferrule ultimately will be mounted. The fiber end is then cleaned to remove resin and other remnants of the fiber manufacture, and the end is then cleaved. The prepared end of the fiber is then advanced into an adhesive filled ferrule. A ferrule 34 attached to a bare end 30 of a fiber 37 by an adhesive layer 35 is illustrated in FIG. 1.

SUMMARY OF THE INVENTION

In an embodiment of the invention, there is provided an automated station for attaching a connector to a portion of a fiber, the station comprising a carrier for supporting the connector that, responsive to a control signal, is moveable in at least two axial directions and is rotatable, and a support for holding the fiber so that the fiber portion is available to receive the connector.

In another embodiment of the invention, there is provided an automated station for attaching a connector to a portion of a fiber, the station comprising a support for holding a fiber so that the fiber portion is available to receive the connector. A detector is provided for determining the alignment of a polarization maintaining axis of the fiber. A carrier is constructed and arranged to support the connector and, responsive to a control signal, will orient the connector into a position that corresponds with the alignment of the polarization maintaining axis of the fiber.

In another embodiment of the invention, there is provided an automated station for attaching a connector to a portion of a fiber, the station comprising a fiber portion working area, a support for holding the fiber so that the fiber portion extends into the fiber working area, a carrier for supporting the connector that, responsive to a control signal, is moveable in the fiber working area, and a heater, responsive to a control signal, that directs heat into the fiber working area to at least pre-set an adhesive that has been included in the connector.

In another embodiment of the invention, there is provided an automated station for attaching a connector to a portion of a fiber, the station comprising a source for supplying a connector at a connector supply location, an adhesive dispenser for filling the connector with adhesive at an adhesive dispensing location, a support for holding the fiber so that the fiber portion is available for mounting by the connector, a heater for at least pre-setting the adhesive filled connector at a heating location; and a carrier that is adapted to support the connector and that is moveable, responsive to one or more control signals, to the connector supply location, the adhesive dispensing location and the heating location.

In another embodiment of the invention, there is provided an automated station for attaching a connector to a portion of a fiber, the station comprising a receiving area for a tray that is adapted to hold the fiber in a manageable configuration, such as coiled, with the fiber portion extending outwardly from the tray, a fiber gripper adapted to support the portion of the fiber and that is moveable, responsive to a control signal, within the receiving area, and a hold down member, responsive to a control signal, that is moveable from a first position that holds the tray in the receiving area and a second position that releases the tray in the receiving area.

In another embodiment of the invention, there is provided an automated station for attaching a connector in a pre-determined orientation to a portion of a fiber, the station comprising a carrier adapted to support the connector, a system for detecting a first orientation of the connector, a support adapted to hold the fiber so that the fiber portion is available to receive the connector, and wherein the carrier, responsive to a control signal, is moveable to position the connector in the pre-determined orientation.

In another embodiment of the invention, there is provided an automated station for attaching a connector to a portion of a fiber, the station comprising a support adapted to hold the fiber so that the fiber portion is available to receive the connector, a carrier adapted to support the connector that, responsive to a control signal, is moveable along the fiber portion in a path including the fiber support, wherein the fiber support, responsive to a control signal, moves out of the path of the carrier after the carrier has been moved a predetermined length along the path.

In another embodiment of the invention, there is provided a method, under computer control, of automatically attaching a connector to a portion of a fiber, including the steps of providing the connector and the portion of the fiber, determining the orientation of the connector, adjusting the connector to a predetermined orientation, and mounting the connection in the pre-determined orientation onto the portion of the fiber.

In another embodiment of the invention there is provided a method, under computer control, of automatically attaching a connector to a portion of a fiber, including the steps of providing a fiber having a polarization maintaining axis, providing a connector, detecting the alignment of the polarization maintaining axis of the fiber, orienting the connector into a position that corresponds to the alignment of the polarization maintaining axis of the fiber, and mounting the connector in the corresponding position to the fiber portion.

In another embodiment of the invention there is provided a method, under computer control, of automatically attaching a connector to a portion of a fiber, including the steps of providing the connector and the fiber portion at a connector attachment station, filling the connector with an adhesive at the connector attachment station, mounting the adhesive filled connector onto the fiber portion at the connector attachment station, and heating the connector mounted on the fiber to at least preset the adhesive at the connector attachment station.

In another embodiment of the invention, there is provided a method, under computer control, of automatically attaching a connector to a portion of a fiber, including the steps of providing a tray for supporting the fiber in a manageable arrangement with the portion of the fiber extending outward of the tray, mounting a connector to the fiber portion extending outward of the tray, temporarily holding the tray against movement, and placing the connector mounted fiber portion back in the tray.

BRIEF DESCRIPTION OF THE DRAWINGS

The invention will be appreciated more fully with reference to the following detailed description of illustrative embodiments thereof, when taken in conjunction with the accompanying drawings, wherein like reference characters denote like features, in which.

DETAILED DESCRIPTION

Figure 1:
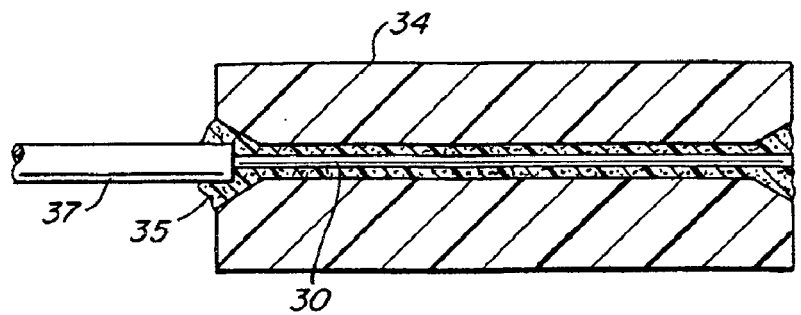
FIG. 1 is a cross-sectional side view of a ferrule attached to a fiber.
Figure 2:
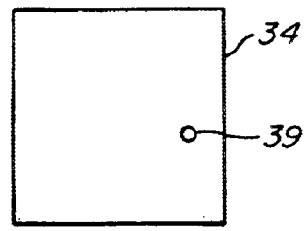
FIG. 2 is an axial view of a fiber ferrule with an offset opening.
Figure 3:
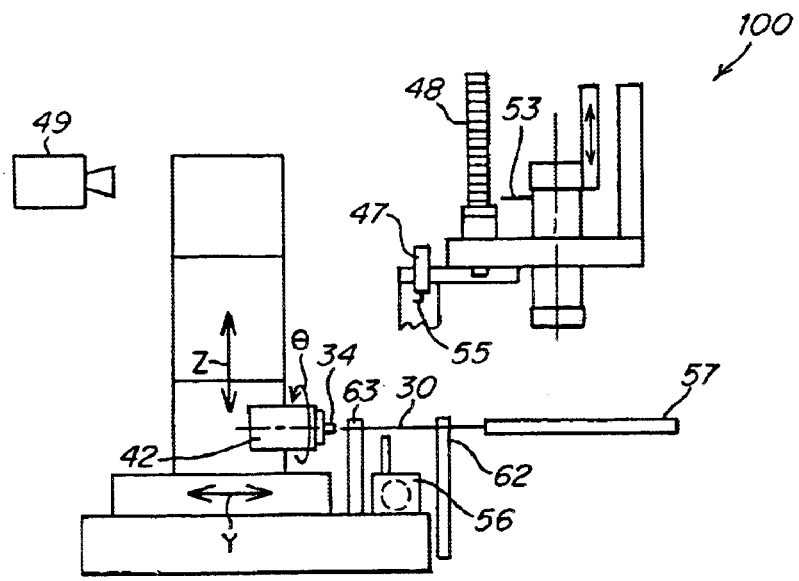
FIG. 3 is a schematic view of an embodiment of the invention.
Figure 4:
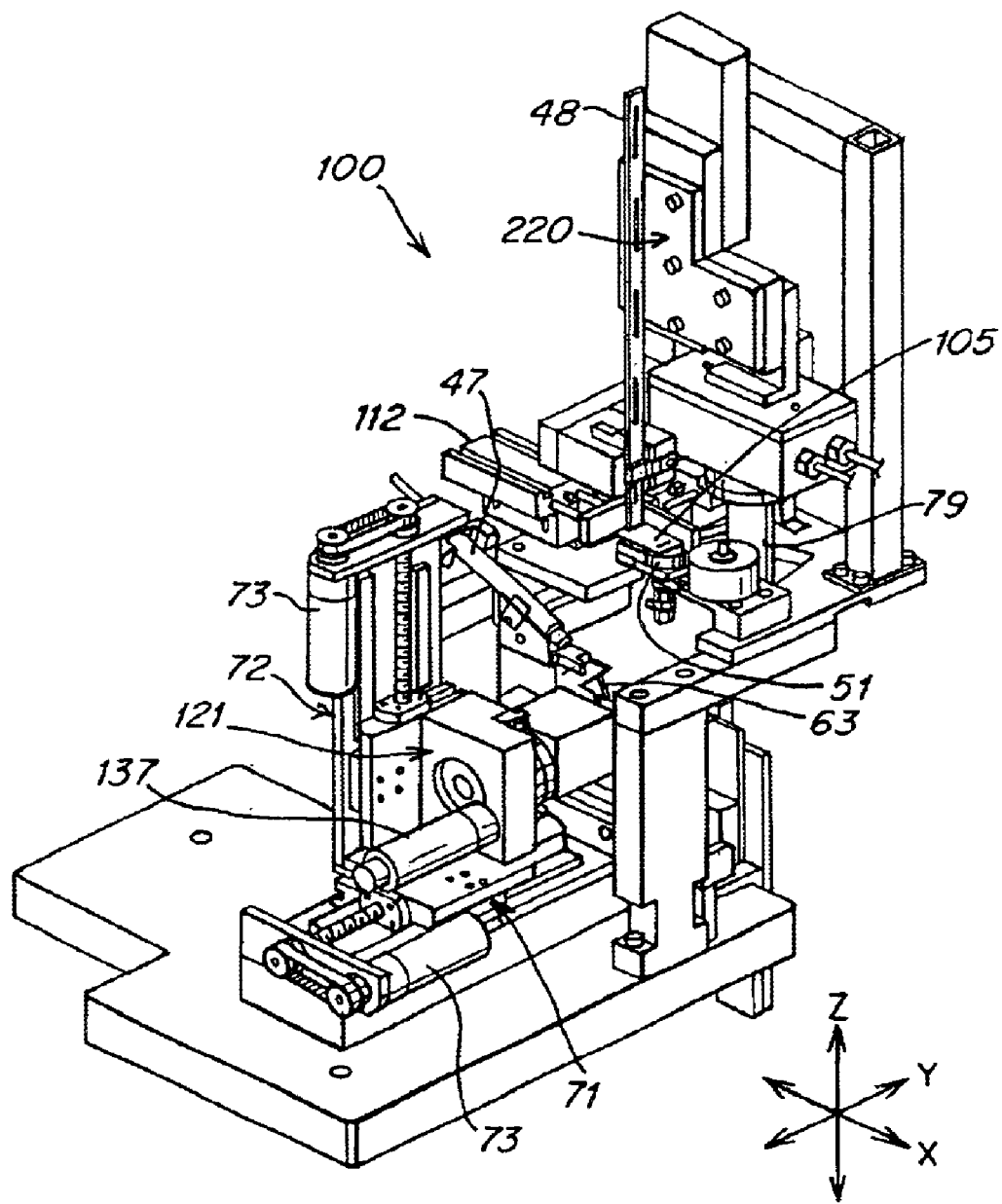
FIG. 4 is a perspective view of a ferrule attachment apparatus according to one illustrative embodiment of the invention.

In an automated system for assembling components to a fiber, such as an optical fiber, a station or module is provided for attaching a ferrule, or other connector, to at least one end of the fiber or such other portion of the fiber as may be desired. The ferrule attachment station may be provided at any suitable location along the system. For example, in an automated system that includes one or more stations for cutting a fiber to a desired length, winding the cut fiber into a coil, positioning the coil on a tray, pre-processing the fiber such as by stripping the outer layers of the fiber away to expose an end portion which will receive the ferrule, cleaning or other treatment of the exposed fiber end, and then cleaving the fiber end, the ferrule attachment station may be the next station in the system. An example of such an automated system is described in a related application entitled "Apparatus and Method for Automated Preparation of an Optical Fiber", filed on even date herewith. In addition to the noted stations, other stations in the automated system may include a polishing station, an inspection station, etc. The above enumerated stations are merely representative of the types of stations that may be included in an automated system for assembling components to a portion of fiber. Neither the foregoing sequence, or any other sequence of such stations, nor the presence of any or all of such stations mentioned, or additional stations not named above, should be considered a limitation of the ferrule attachment station. Thus, it is envisioned that the ferrule attachment station may be part of an automated component assembling system that includes only some of the previously identified process stations. Further, it is contemplated that the automatic ferrule attachment station may be a stand alone module for joining a ferrule to an optical fiber that had been prepared separately whether by an automated system, or manually. That is, the ferrule attachment station may be arranged to mount a ferrule to a fiber end whether the fiber is presented to the ferrule attachment station within the overall sequence of an automated system or, rather, is presented in a stand alone operation.

The ferrule attachment station may perform one or more of the following functions automatically, that is without requiring manual user interaction: accepting a stripped end of an optical fiber, maintaining the stripped end of the fiber in a predetermined location that is accessible to mounting by a ferrule, deploying a ferrule from a supply of ferrules, determining the orientation of the ferrule and then re-orienting (if necessary) the ferrule, depositing an adhesive into the ferrule (if the ferrule has not been pre-loaded with an adhesive), mounting the ferrule onto the prepared fiber end, heating the adhesive to secure the attachment of the ferrule and the fiber end, and then releasing the ferrule attached fiber end from the station for subsequent processing if desired.

The optical fiber may be pre-arranged on a tray or other pallet type device that is delivered to a tray receiving area in the ferrule attachment station. The tray may be constructed for compatibility with a transport system that may be used to deliver the fiber to one or more stations within an automated system for fabricating an optical fiber and component. The tray may be arranged with a retainer for maintaining the extension of a stripped fiber end outwardly from the tray and a receptacle for maintaining the rest of the fiber as coiled within the tray. A second retainer may be provided to hold, within the internal confines of the tray, the fiber end after it has been attached to a ferrule. By not leaving the ferrule mounted end hanging over the edge of the tray, the likelihood of damage to the ferrule or interference with subsequent processing steps should be reduced. A pair of first and second retainers may be provided when a ferrule will be attached to each end of the fiber (i.e., pigtail).

An example of one tray suitable for use with any embodiments of the present invention is described in co-pending U.S. patent application entitled "Tray for a Coiled Optical Fiber", filed on even date herewith, and incorporated herein by reference. However, it should be appreciated that the embodiments of the present invention directed to automatically attaching a ferrule to an optical fiber end are not limited to use with any particular transport medium.

Although the ferrule attachment station has been described in connection with an optical fiber that has been arranged on a tray, the use of a tray is not a limitation of the ferrule attachment station. Consequently, other presentations of an optical fiber also are contemplated. For example, and without limiting the invention, a fiber may be coiled and then secured in the coiled arrangement using a cable-tie, or other coil fastener. Alternatively, the fiber length need not be coiled. All that is necessary is that the fiber end be deployable into the station for the desired manufacturing operations. However, it is contemplated that providing the fiber in a coiled or other manageable configuration will facilitate automated assembly of a connector to the fiber.

A ferrule attachment station may include one or more of the following constituent devices and/or station areas which first will be described generally and then each constituent will be discussed in more detail. As shown in FIGS. 3–7, the ferrule attachment station includes a collet 42 for positioning and manipulating a ferrule 34 relative to the other devices and areas within the station. The collet shown is moveable in the "Y" and "Z" axes, but a collet also is contemplated that is moveable along the "X" axis as well. For purposes of this patent application, "X" is the horizontal axis across the station, "Z" is the vertical axis relative to the station, and "Y" is an axis perpendicular to the "X" axis and that extends between the front and the back of the station. The collet also may be rotatably moveable. A magazine 48 or other source of an inventory of ferrules is provided and cooperates with an escapement 105 and a loader 53 to provide a delivery system for presenting an individual ferrule to the collet when it is present at the ferrule loading area. A dispenser 47 introduces a preprogrammed amount of adhesive into the ferrule when the collet locates the ferrule in an appropriate position relative to the dispenser outlet. An entrance into the station may include a receiving area 57 for a tray supporting a fiber coil. Adjacent the tray receiving area, a clamp is provided to hold the bare fiber end along a path that will be traveled by the collet. The clamp may include a primary clamp 63 that supports a jacketed portion of the fiber, and a secondary clamp 62 that supports the ferrule mounting segment of the bare fiber. A heater 56 may be activatable to partially or fully cure the adhesive after the ferrule has been mounted to the fiber end. A gripper 75 may be provided for carefully picking up the ferrule mounted fiber end and placing it in a desired location in the tray or other coil support device. A hold down member 80 may be deployed to clamp the tray when the "pick and place" fiber gripper is repositioning the ferrule mounted fiber end in the tray. The various components may be under computer control.

Now certain individual components of the ferrule attachment station will be discussed in more detail.

Figure 8:
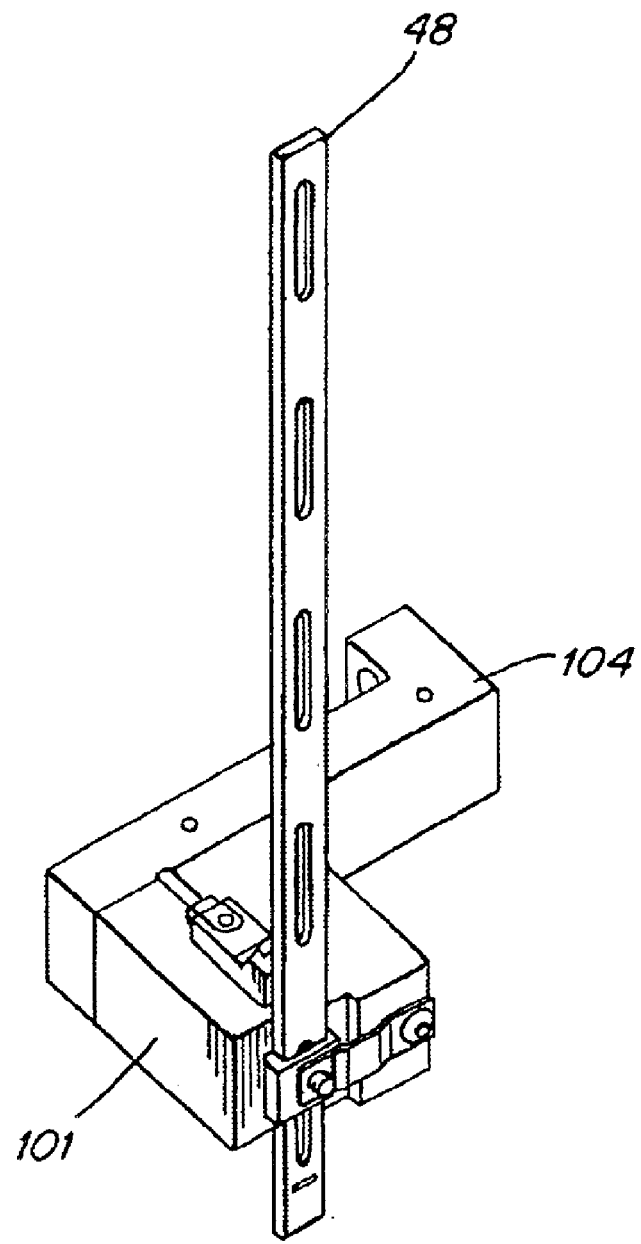
FIG. 8 is a perspective view of a ferrule supply according to one illustrative embodiment of the invention.
Figure 9:
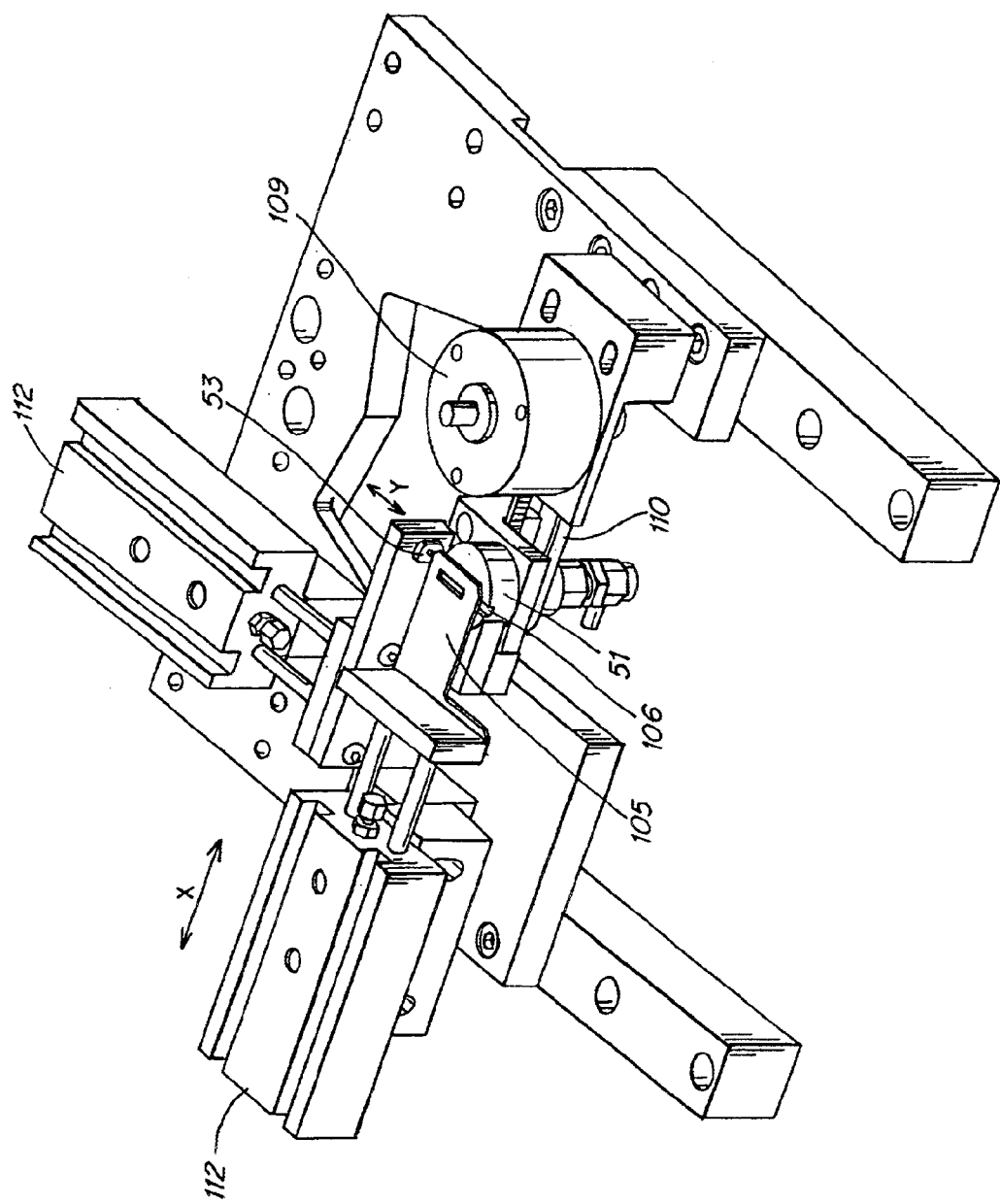
FIG. 9 is a perspective view of a ferrule delivery system according to one illustrative embodiment of the invention.

A supply for feeding a stack of ferrules to the collet is shown in FIGS. 8–9. A magazine 48 supported by a magazine mount block 101 is mounted by a bracket 104 to the ferrule attachment apparatus. The magazine exit opens directly above a slide pusher 105 (see FIG. 9). When the slide pusher 105 is retracted along the X-axis, a ferrule is gravity fed into the slot 106. The slide pusher 105 is moved forward, loading the ferrule into a chuck, such as the illustrated cylindrical vacuum chuck 51. The slide pusher 105 then retracts to load another ferrule. A vision system 49 (see FIG. 3), includes a camera, or other imaging device, linked to a computer, so that an image of the ferrule 34 taken by the camera can be examined, to determine if the ferrule is in the desired orientation. The vision system may check the location of the ferrule opening and/or may determine what type of opening is being presented to the collet 42. Other methods of determining the orientation of the ferrule 34 also are contemplated. For example, a probe may be used to physically detect the location of the ferrule opening or the type of ferrule opening. If it is desirable to reverse the orientation of the ferrule, the chuck 51 may be rotated 180 degrees, switching the ferrule end which is presented to the collet 42. A pneumatic actuator may rotate the chuck 51 with a timing belt 110. After acceptance of the orientation of the ferrule, a pusher tool such as, for example, a pin 53 may be actuated to present the ferrule to the collet. The slide pusher 105 and pin 53 may be actuated with dual rod cylinders, belt systems, electric motors, or any other suitable actuators. Pneumatic dual rod cylinders 112 are shown in FIG. 9.

Figure 10:
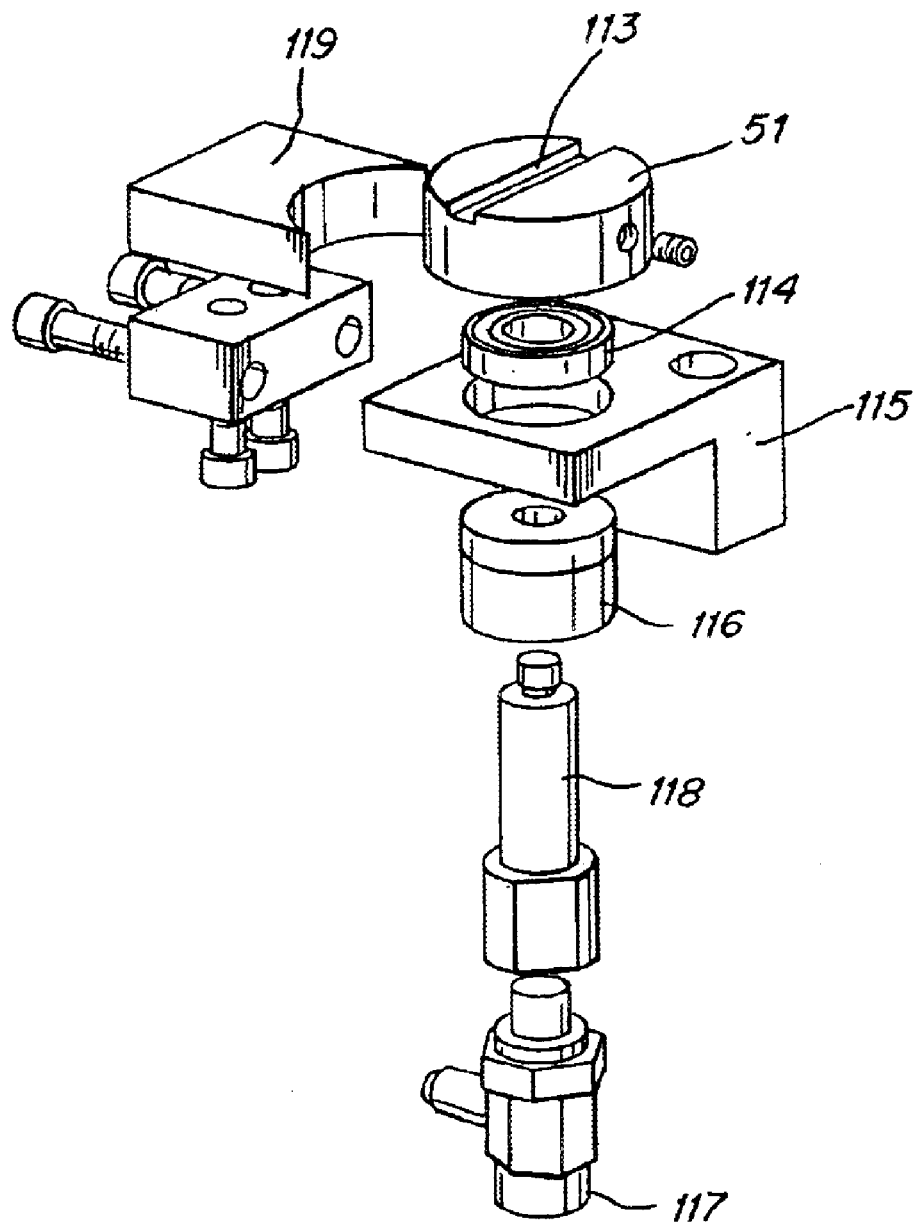
FIG. 10 is an exploded perspective view of a ferrule orienter according to one illustrative embodiment of the invention.

Referring to FIG. 10, a chuck 51 may be mounted on a bearing 114 in a bearing block 115. A pulley 116 may be rotated by the timing belt 110 described above. A swivel fitting 117 and a vacuum shaft 118 direct a vacuum force that holds a ferrule against one edge of a vacuum slot 113 in the chuck 51. A load floor 119 abuts and is co-planar with the vacuum chuck 51 so that the ferrule may be loaded into the vacuum chuck 51 by sliding it across the load floor from the ferrule magazine 48.

Figure 11:
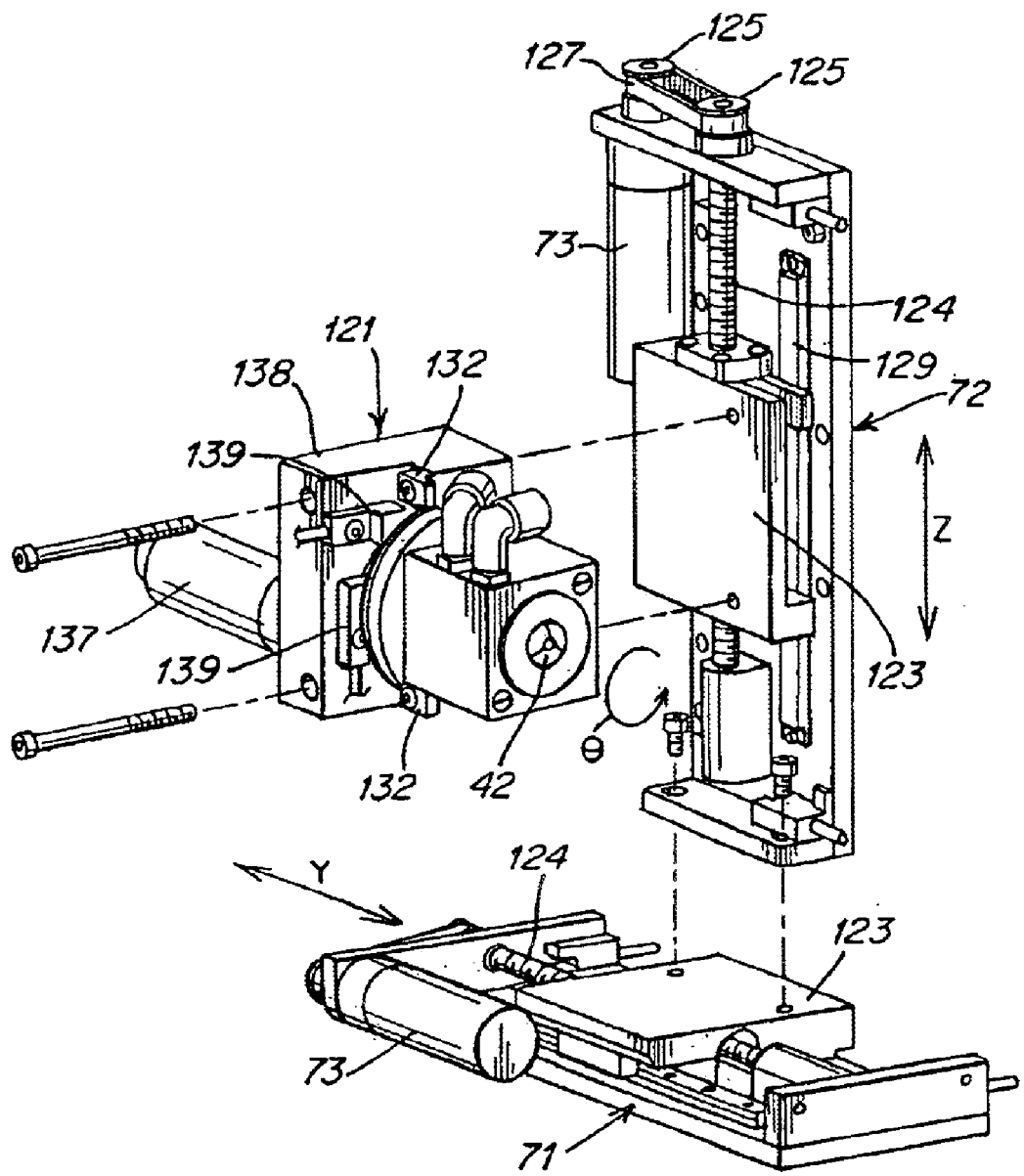
FIG. 11 is an exploded perspective view of a ferrule support according to one illustrative embodiment of the invention;.
Figure 12:
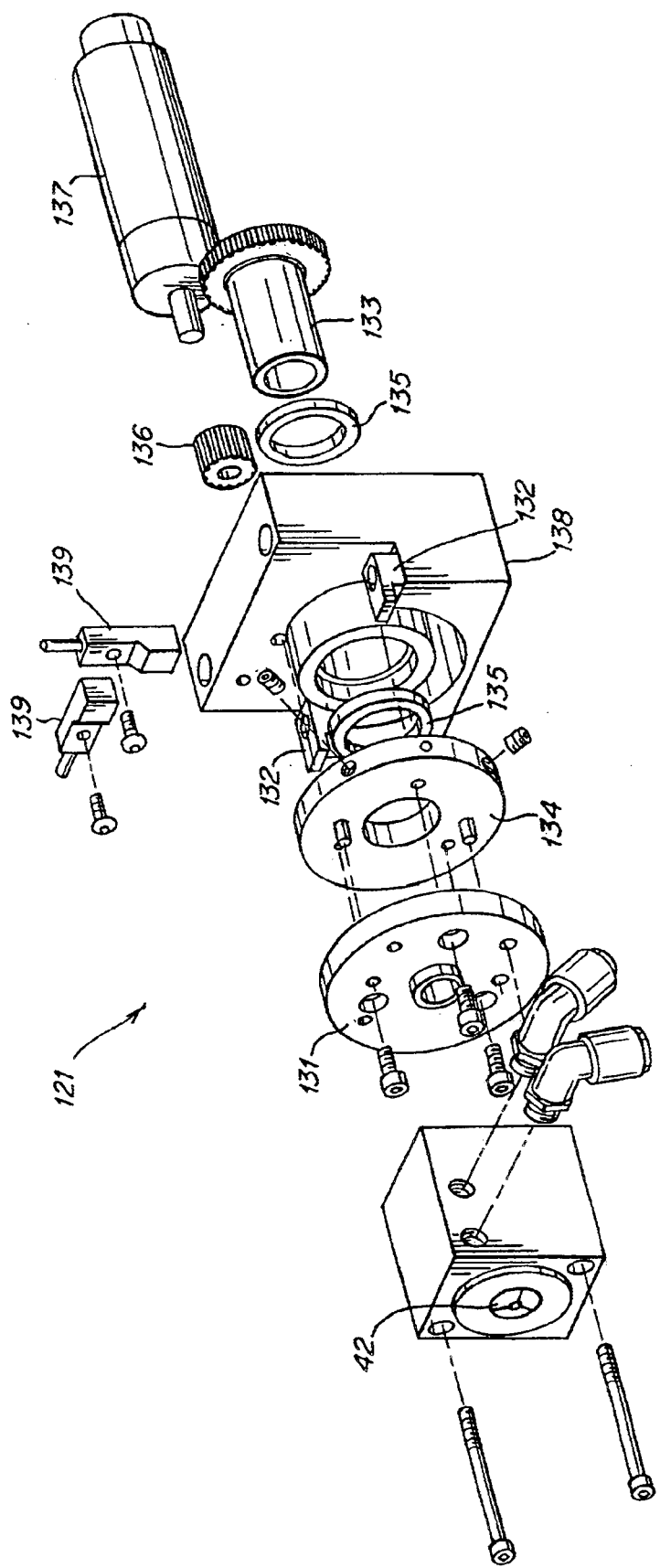
FIG. 12 is an exploded perspective view of a ferrule support according to one illustrative embodiment of the invention.

The collet 42 approaches, grasps and removes the ferrule 34 presented by the chuck. If necessary, the collet 42 may also rotate, before and/or after grasping the ferrule 34, to re-orient the ferrule 34; particularly where an offset fiber through hole in a ferrule is not in a desired, pre-determined orientation. Horizontal and vertical linear drive assemblies 71 and 72 move the collet 42 up and down ("Z" axis) and side to side ("Y axis"), as illustrated in FIG. 11. In each drive assembly 71 and 72, a carriage 123 moves linearly with the turning of a lead screw 124, which may be, for example, a ball screw. An electric motor 73 rotates the lead screw 124 with a belt 127 and pulley 125 system. An encoder 129 may be used to sense the linear position of the carriage 123 and hence the collet 42. Alternately, a rotary encoder may be used on one of the pulleys 125 to determine the linear position of the carriage 123. The collet 42 may be rotated by a drive assembly 121 as shown in FIGS. 11–12. A collet mount 131 holds the collet 42 and is coupled to a collet gear 133 by a mount plate 134, and the assembly rotates in bearings 135 that are mounted in collet axis body 138. A drive gear 136 that is rotated by an electric motor 137 turns the collet gear 133. Two rotary stops 132 prevent the collet 42 from rotating beyond certain angles. A pair of sensors 139 may be added to sense the rotational position of the collet 42. Other arrangements for moving a collet in any combination of the "X", "Y", and/or "Z" axes and/or rotating the collet are contemplated as should be apparent to one of skill in the art.

Figure 13:
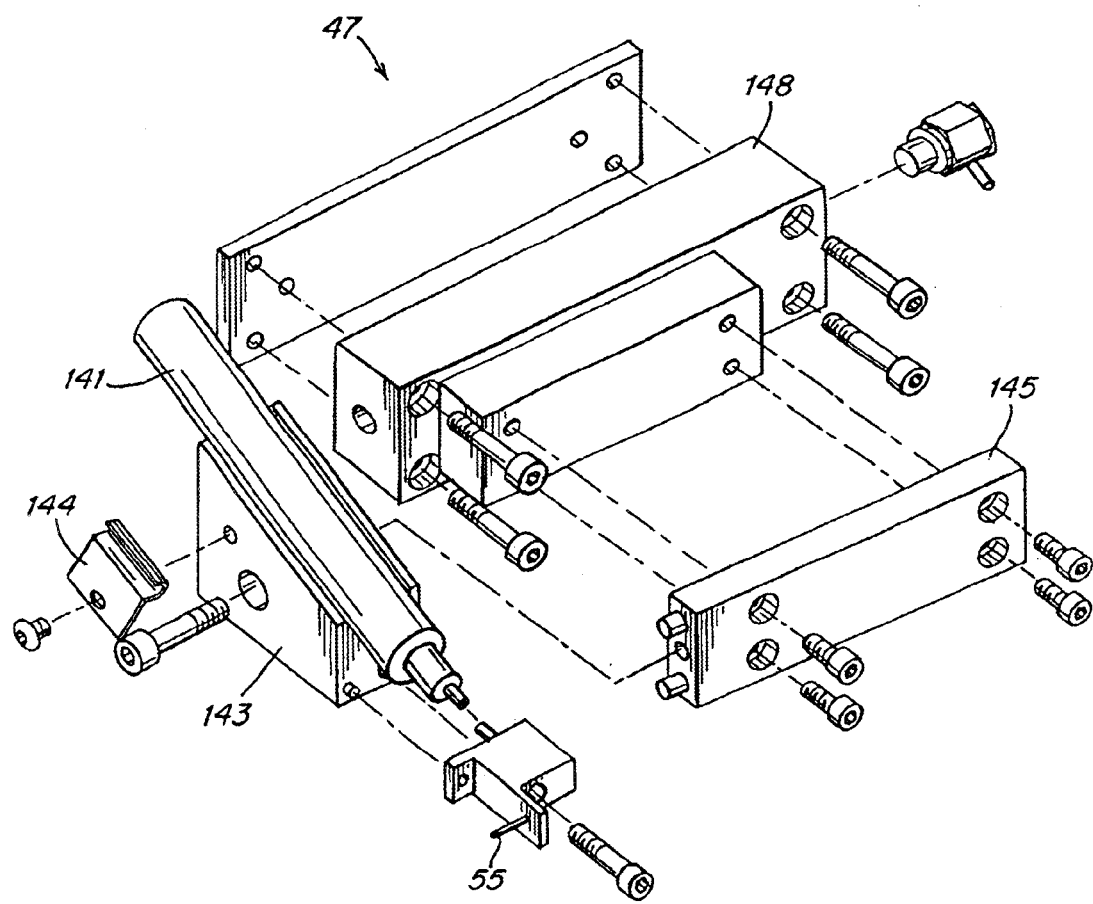
FIG. 13 is an exploded perspective view of an adhesive dispenser according to one illustrative embodiment of the invention.

After accepting the ferrule, the collet then finds the adhesive dispenser. In an embodiment illustrated in FIGS. 3–7, the collet 42 moves downward along the Z-axis bringing the ferrule 34 adjacent the dispenser allowing adhesive to deposit through a needle 55 into the ferrule. The dispenser for depositing adhesive, such as epoxy, into the ferrule is shown in more detail in FIG. 13. A syringe 141 type dispenser, responsive to a control signal, releases a predetermined amount of epoxy through a needle 55 into the ferrule. A disposable syringe 141 is held in an adhesive mount 143 by a clip 144. The adhesive mount 143 is attached to a slide block 145. The slide block 145 may be mounted on an air actuator 148. The air actuator 148 may be used to provide a small resistance that helps to maintain contact between the ferrule 34 and the needle 55 and/or the air actuator 148 may help to move the needle 55 into contact with the ferrule 34. For example, an air pressure of approximately 1–5 psi may be supplied to the air actuator to provide a constant, or variable, preload force that resists the push of the ferrule, but does not act as a hard stop which might damage the needle 55 or the ferrule if a component is misaligned or the ferrule is moved to far over the needle. Other adhesive dispensers also are contemplated, and the invention is not limited to the particular arrangement described above. For example, a positive displacement system may be used to push the epoxy through the needle 55. A suitable epoxy, is Epo-Tek®353ND. Two-part epoxies that cure without the application of heat may also be used. The type of adhesive administered by the dispenser is not a limiting feature of the invention.

The collet 42 carrying the adhesive filled ferrule approaches the site where the bare end of the fiber is supported by a fiber clamp. The fiber clamp may include a primary fiber clamp and a secondary fiber clamp. The primary fiber clamp 62 may act as a coarse locator and support, holding an unstripped portion of the fiber 30 (i.e., still includes a fiber jacket). A secondary fiber clamp 63 may be employed to grip the stripped portion of the fiber end. The secondary fiber clamp 63 grasps the fiber at a predetermined location beyond a preprogrammed length of travel by the collet (for example, 25% of the ferrule length) at which point the collet may adequately support the tip of the fiber itself. When the collet advances to the preprogrammed length, the secondary clamp releases so it will not obstruct further movement of the collet. The collet continues moving along the fiber tip until the ferrule is fully mounted. The collet may be rotated and/or moved reciprocatingly to more evenly distribute the adhesive within the ferrule. The rotational motion of the ferrule may also help to prevent buckling of the fiber. The collet 42 having released the ferrule 34, returns to the ferrule supply area to acquire the next ferrule 34.

Figure 14:
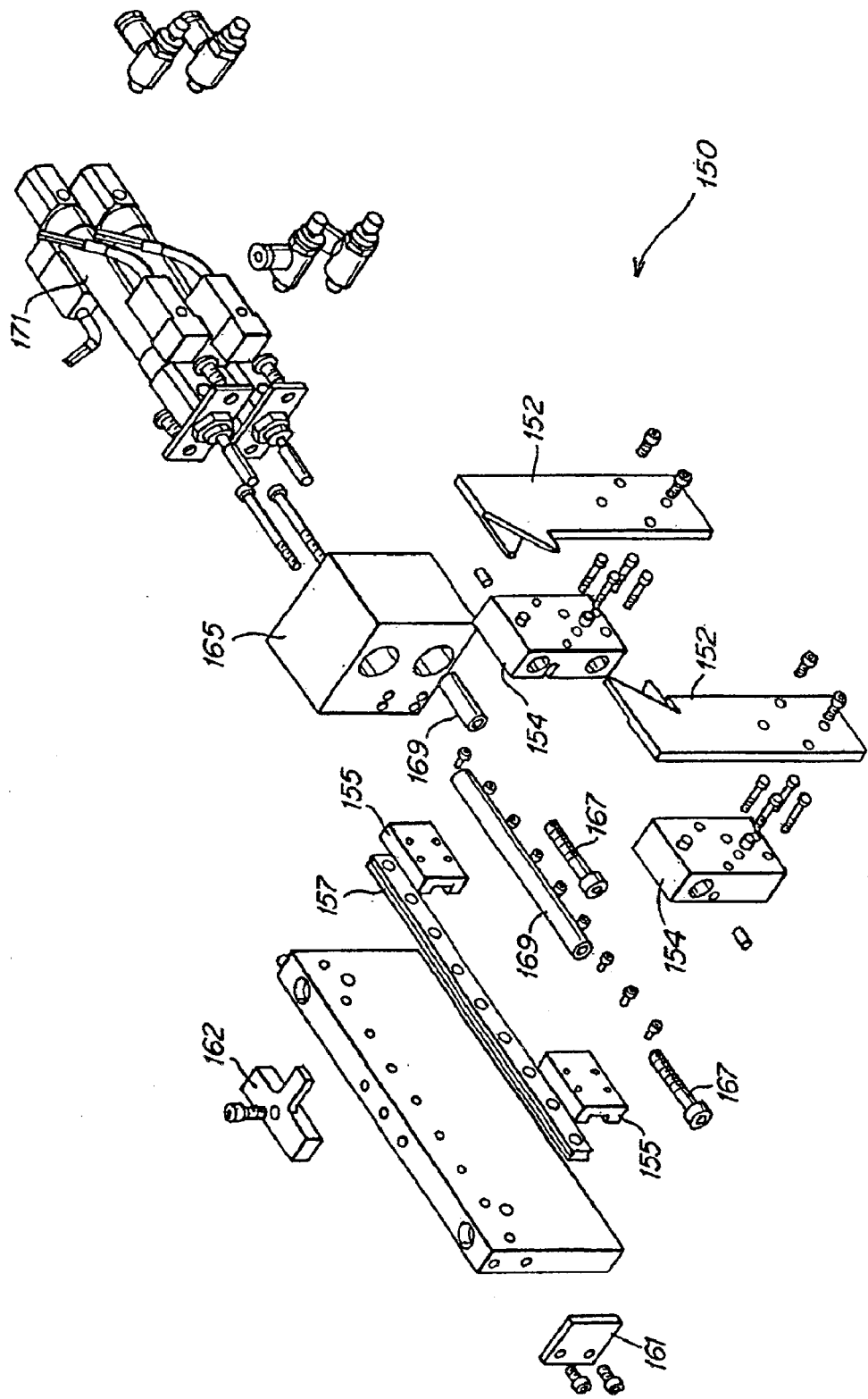
FIG. 14 is an exploded perspective view of a fiber support according to one illustrative embodiment of the invention.

FIG. 14 shows an exploded perspective view of a clamp type holding support for a bare end of the fiber end. The fiber clamp includes a pair of opposed blade type clamp jaws 152 that are movable toward one another to grip the stripped end of the fiber. The fiber is captured and held by the sideways facing V-shapes of the jaws 152. The clamp jaws 152 are mounted to clamp blocks 154 which slide on carriages 155. The carriages 155 move linearly on a rail 157, but any suitable method of bringing the two jaws 152 together may be used. A stop 161 on one end and a cylinder mount 165 on the other end provide limits to the outward movement of the clamp jaws 152. A hard stop 162 prevents the clamp jaws 152 from closing too far and damaging the fiber. Fasteners 167 attach the clamp blocks 154 to cylinder couplings 169 that are driven by pneumatic cylinders 171 in opposite directions. That is, one coupling retracts while the other extends to open and shut the jaws. Any suitable actuator may be used to bring the two jaws 152 together such as, for example, a solenoid or electric motor. A single actuator coupled to both clamp jaws 152 may also be used.

An example of one type of holding support suitable for use with any embodiments of the present invention is described in co-pending U.S. patent application entitled "Centralizing Clamp for an Optical Fiber", filed on even date herewith, and incorporated herein by reference. However, it should be appreciated that the embodiments of the present invention directed to automatically attaching a ferrule to an optical fiber end are not limited to use with any particular holding support means.

Figure 15:
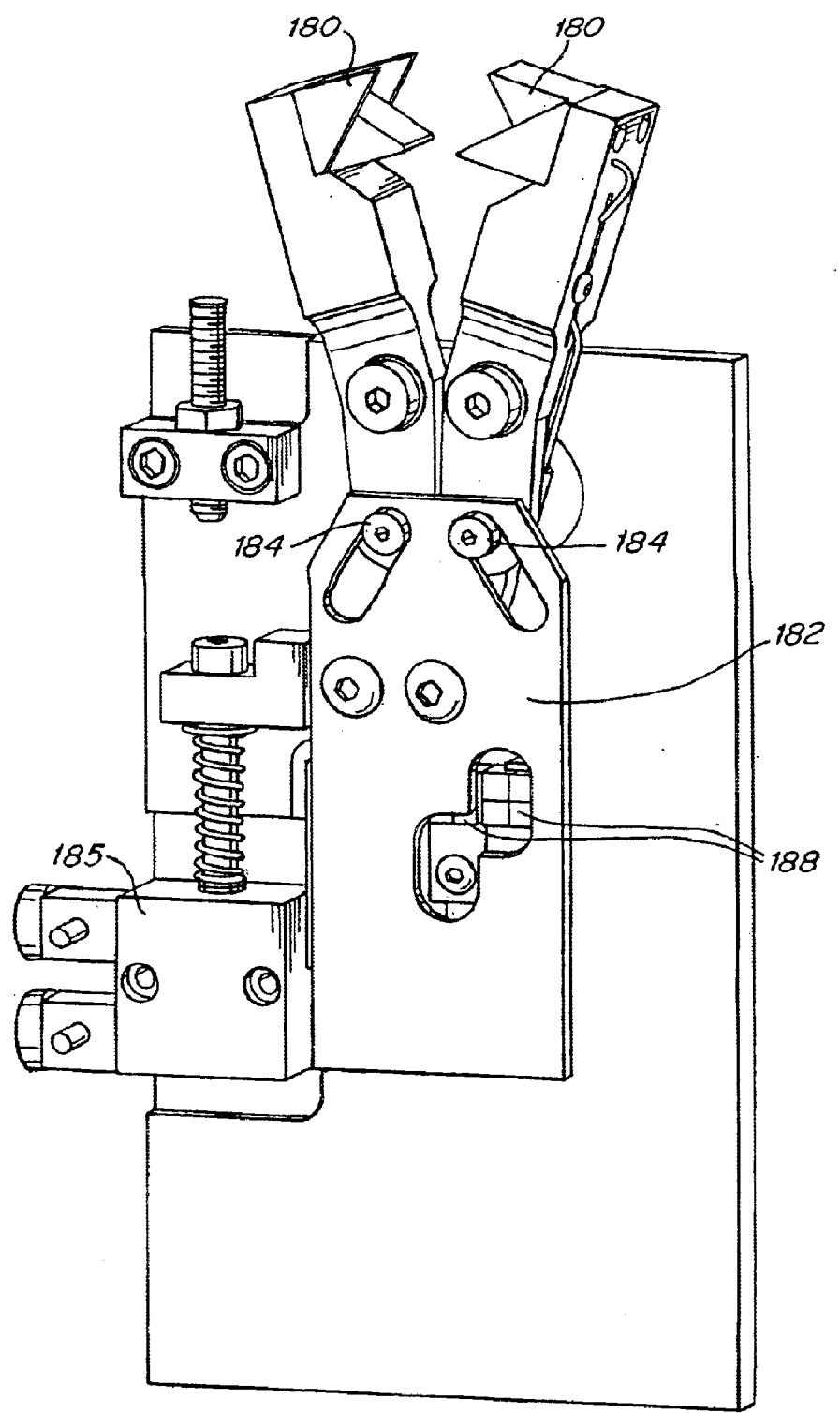
FIG. 15 is a perspective view of a fiber support according to one illustrative embodiment of the invention.

The fiber clamp 150 illustrated in FIG. 14 may also be used as a primary fiber clamp. Alternatively, a primary fiber clamp may take a different form, such as the arrangement shown in FIG. 15. A pair of clamp jaws 180 are closed and opened by a cam plate 182 which moves two cam followers 184 to rotate the jaws 180. The cam plate 182 is moved by an actuator such as the pneumatic cylinder 185 shown in the drawing. A sensor may be included within the fiber clamp to detect the presence of a fiber. Open/close sensors 188 also may be employed to detect whether the jaws are opened or closed. Other arrangements for supporting the fiber end against the mounting movement of the collet are contemplated as should be appreciated by one of skill in the art.

An example of another embodiment of a primary fiber clamp suitable for use with any embodiments of the present invention is described in the above-referenced Centralizing Clamp Application. Again, it should be appreciated that the embodiments of the present invention are not limited to use with any particular holding support medium.

Figure 16:
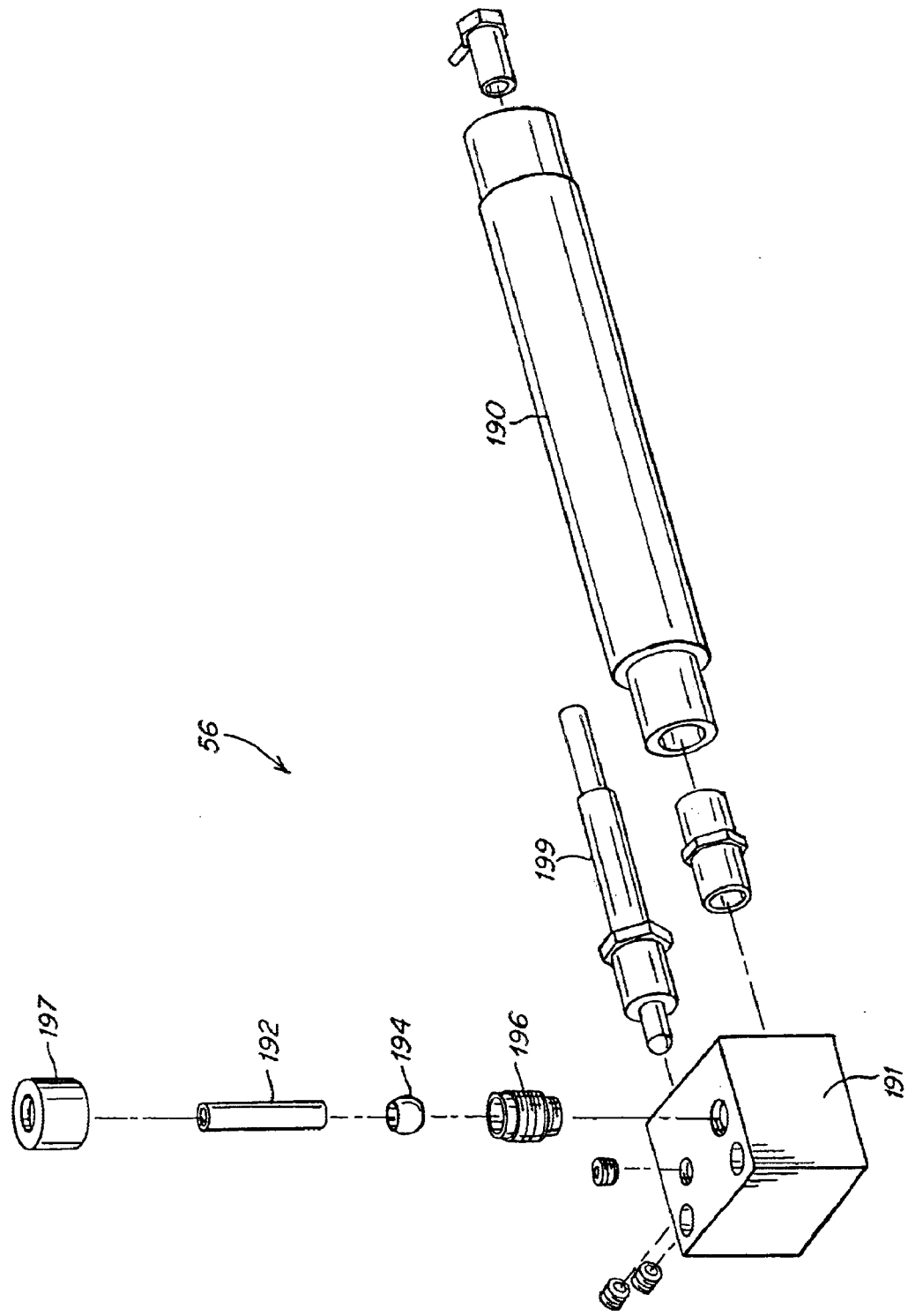
FIG. 16 is an exploded perspective view of a heater according to one illustrative embodiment of the invention.

With the ferrule mounted about the fiber end, the heater 56 may be activated to set or cure the adhesive. The heater 56 may be a hot air blower, as shown in FIG. 16, or it may be another suitable heater as should be recognized by one of skill in the art. The illustrated heat gun includes an air heater 190 connected through a manifold 191 to a heater shaft 192 that directs the heated air at the ferrule. The heater shaft 192 and a heater ball 194 are secured to a swivel base 196 by a heater nut 197 so that the direction of the airflow may be adjusted. A thermocouple 199 may be included to detect the temperature of the airflow and help to maintain desired temperatures. A pressure sensor (not shown) may also be included to signal a controller to shut off the heater 190 if low airflow is detected. The air heater 190 may be, in one embodiment, a 200-watt triple pass inline heater. Other suitable devices for delivering heat to the ferrule may be used, including contact heaters and radiant heaters.

Figure 5:
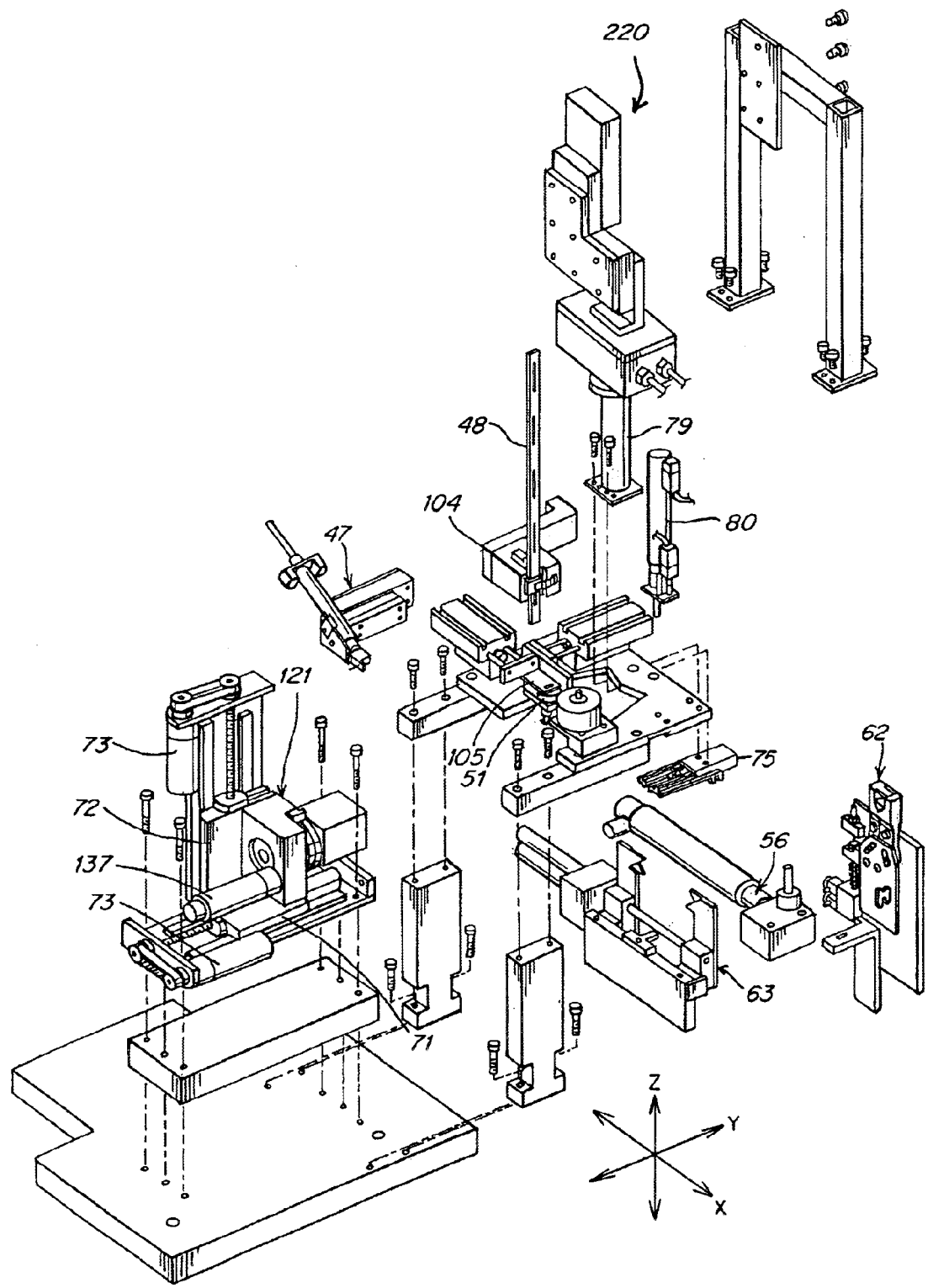
FIG. 5 is an exploded perspective view of the ferrule attachment apparatus of FIG. 4.
Figure 6:
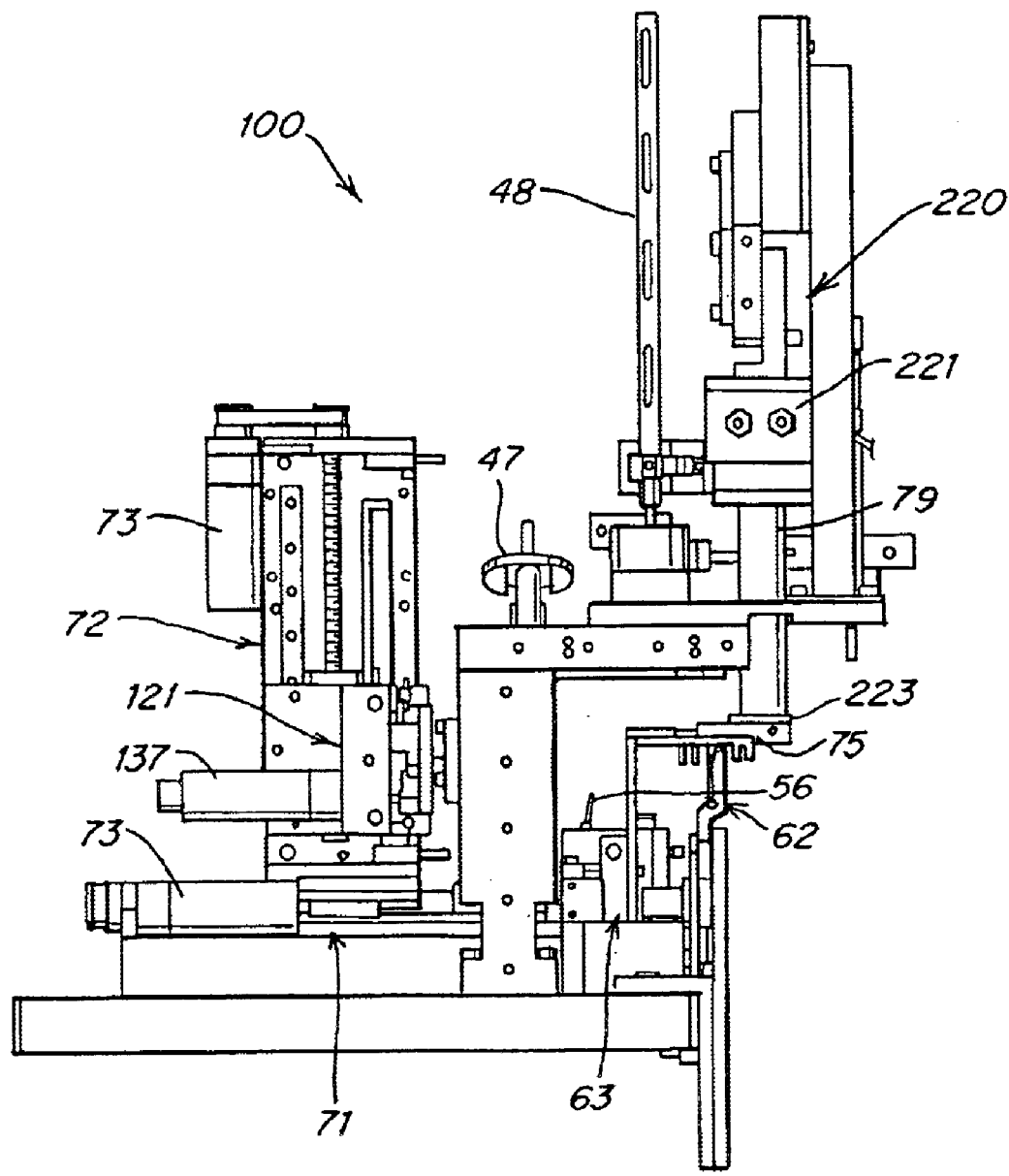
FIG. 6 is a side elevational view of the ferrule attachment apparatus of FIG. 4.
Figure 17:
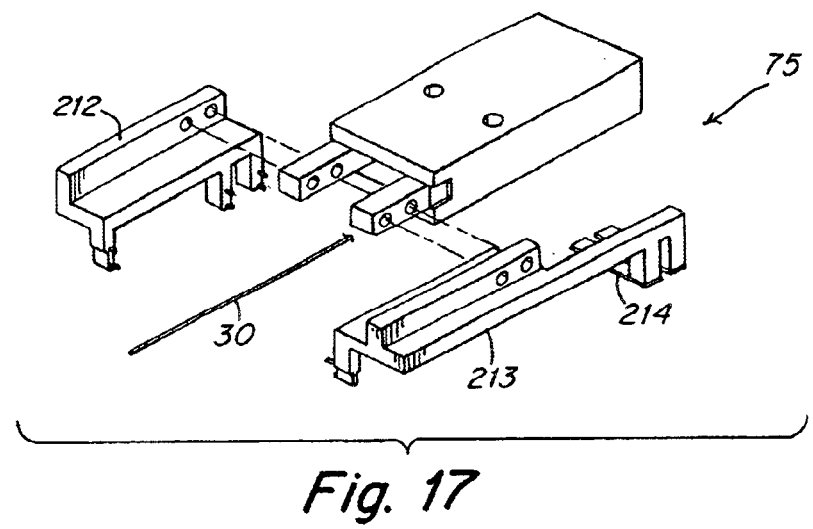
FIG. 17 is an exploded perspective view of a fiber gripper according to one illustrative embodiment of the invention.
Figure 18:
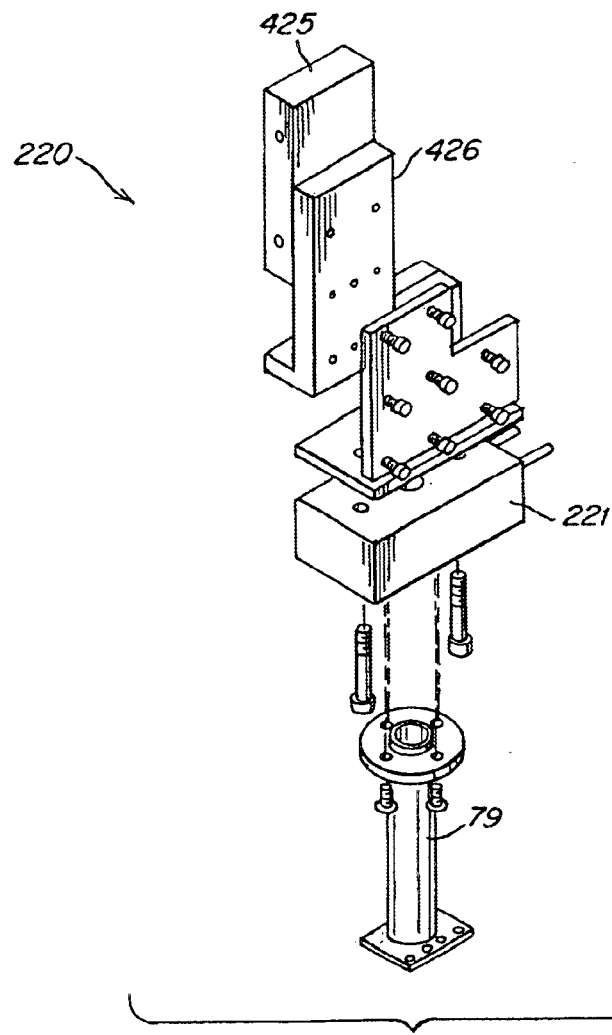
FIG. 18 is an exploded perspective view of a fiber gripper according to one illustrative embodiment of the invention.

After completion of a predetermined heating cycle, the primary and secondary fiber clamps open, releasing the fiber. A hold down member 80, such as the pneumatically driven piston illustrated in FIG. 5, is deployed to clamp the tray. A fiber gripper grasps and then repositions the ferrule mounted end of the fiber within the internal confines of the tray, so that the fiber end no longer hangs from the side of the tray as it did when it was first received in the entrance area of the station. FIG. 17 shows an exploded view of a fiber gripper 75 that may be employed in the present invention and that includes two gripper arms 212 and 213 that move toward one another to grasp the fiber 30. Gripper arm 213 includes a fiber support 214 for supporting the fiber as the gripper 75 lifts, rotates and lowers the ferrule mounted end into a retainment position within the tray. FIG. 18 shows a fiber gripper drive assembly 220 that includes a rotational drive system 221 for rotating a spindle 79. The rotational drive may be mounted on a linear drive system so that the gripper may be moved in the Z direction. Two linear actuators 425 and 426 are shown in FIG. 18. Other suitable arrangements for moving the ferrule gripper 75 may be employed, and the gripper may be arranged for movement along any combination of the "X", "Y" and/or "Z" axes, although the gripper illustrated in the Figures is arranged only for movement along the Z axis. After the ferrule mounted fiber end is properly positioned in the tray, the hold down member retracts freeing the tray for movement away from the ferrule attachment station.

Figure 7:
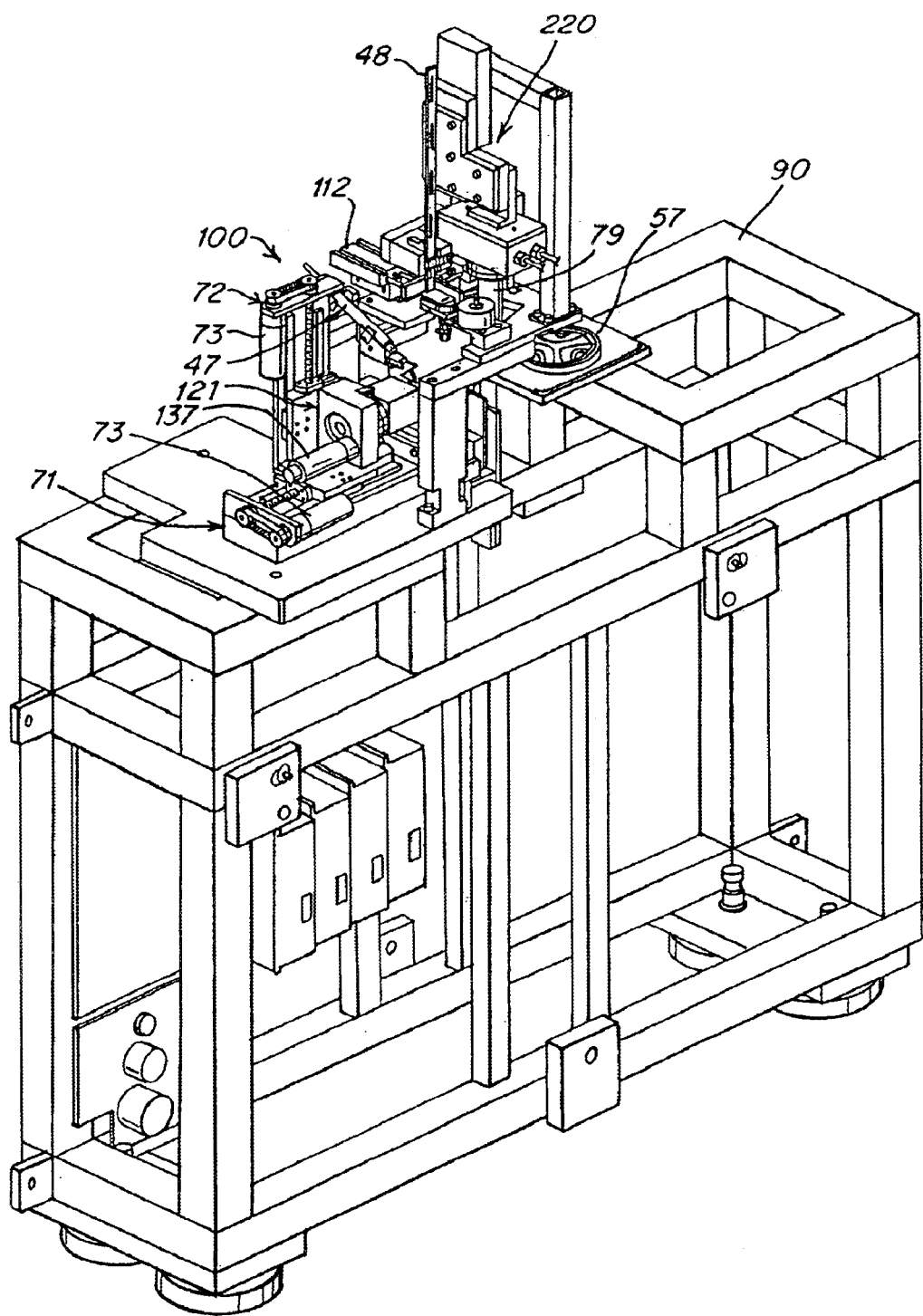
FIG. 7 is a perspective view of a ferrule attachment apparatus according to one embodiment of the invention.

A frame 80 supports the ferrule attachment module 100, and additionally may house various electronics, pneumatic controls and connections, and a dedicated controller if desired as well as other displays, input devices and so on as illustrated in FIG. 7. The automated ferrule attachment station may be arranged to respond to signals from a computer controller; the controller being arranged to receive and transmit signals from and to various components, to control the various operations of the ferrule attachment station. The computer controller may be arranged to communicate with the various station components by direct hard link, wireless, and other arrangements as would be apparent to one of skill in the art. The computer controller may receive a signal that a particular step has begun or ended and the controller may, responsive to such a signal, generate a new signal initiating one or more operations of various of the devices incorporated into the station. The controller can be implemented in any of numerous ways, as the present invention is not limited to any particular technique. In accordance with one illustrative embodiment of the present invention, the controller is a processor that is programmed (via software) to perform the above-recited control functions, and to coordinate interaction amongst the various system components. Of course, it should be appreciated that other implementations are possible, including the use of a hardware controller, and/or multiple controllers that replace a single central controller. As an example, and without limiting the invention, the controller may include a Windows NT based PC, and a distributed I/O system using a field bus such as CANOpen.

As an example, and without restricting the control features that may be employed with the automated ferrule attachment station, one or more sensors may be provided to detect the location of a workpiece and then the controller responsive to such a sensed signal may cause one or more components within the station to perform a desired function. Thus, a sensor may be provided to detect when the collet has advanced the ferrule a predetermined distance over the fiber end. Upon receipt of such a signal from the sensor, the controller may transmit a signal causing the secondary fiber clamp to retreat out of the path of further movement of the collet. Other arrangements, of course may be employed to influence a device to begin or cease a particular function. Thus, the drive system for moving the collet towards the fiber end could have a pre-set limit switch that is triggered when the collet has advanced a predetermined distance, or a predetermined timing sequence corresponding to the time required for the collet to advance the predetermined distance may be employed that, when completed triggers withdrawal of the secondary fiber clamp.

The previous examples, as should be apparent to one of skill in the art, merely inform that different control components are compatible with the automated ferrule attachment station and that the invention described here is not limited to any particular control system. Further, the control system may be arranged, or modified, to accept various work pieces, such as fibers, ferrules, adhesives, and or trays, of varying sizes, shapes, composition and/or other variables. Any of the pneumatic actuators described herein may be provided with a sensor to acknowledge that a stroke has completed. Any of the drive systems discussed herein may be provided with an encoder so that encoder feedback may be employed by the controller to determine the location of a component. Other arrangements for determining the location of a component within the station also are contemplated and the invention is not limited only to encoder type systems as should be apparent to one of skill in the art.

A representative control sequence now will be described. The presence of a tray in the receiving area is sensed and a signal is generated by the controller and transmitted to the primary clamp which closes around the still jacketed portion of the fiber adjacent the bare end. A sensor in the jaws of the primary clamp checks to ensure that a fiber is present and the controller then sends a signal to close the secondary clamp about the stripped and cleaned portion of the fiber end where the ferrule will be mounted. A collet, supporting a ferrule, is directed by the controller to advance in a mounting path along the bare fiber end. The secondary clamp is directed to retract when the collet has moved a predetermined length. The collet is instructed to move along the mounting path until it reaches a final position. The collet may be instructed to rotationally oscillate as it moves along the mounting path. It also may be instructed by the controller to move in reciprocating fashion. The controller then issues a signal activating the heater for a predetermined dwell time. The fiber gripper is instructed to move to the ferrule/fiber assembly and then a signal from the controller opens the jaws of the gripper which then close about the fiber and the ferrule. The controller deploys the tray hold down member and then the collet is opened and withdrawn from the ferrule. The fiber gripper is then instructed to rotate the ferrule mounted fiber end over the tray and then places the assembly in a predetermined position within the tray so that the pigtail is within the interior of the tray rather than hanging outwardly as it was when it arrived at the ferrule attachment station. The controller then sends a signal causing the hold down member to release the tray. As the fiber gripper is manipulating the ferrule mounted fiber end, the controller instructs the escapement to deposit a ferrule in the chuck. The vision system determines the orientation of the ferrule and, if necessary, the controller directs the chuck to rotated 180 degrees to a desired orientation. The collet is directed by the controller to move to the chuck to pick up the ferrule. A loading tool, such as a pin, is activated by the controller to move the ferrule into the collet which then closes around the ferrule. The collet is instructed by the controller to move to the adhesive dispenser and then the adhesive dispenser is activated by the controller to deposit a predetermined amount of adhesive into the ferrule. The collet is then instructed by the controller to move to the area of the secondary clamp where it awaits the presence of a new tray.

The automated ferrule attachment station may be arranged to operate two or more of its constituent devices simultaneously. For example, after the collet has accepted a ferrule and moved away from the chuck area, a new ferrule may be supplied by the magazine and placed in the chuck awaiting return of the collet. Similarly, when the "pick and place" fiber gripper is returning the ferrule attached fiber end from the heating area back to the tray, the collet may deploy to the chuck area to receive a new ferrule as mentioned above. Alternatively, the station may be configured so that only one constituent device is activated at a time; so referring back to the previous example, the collet would refrain from approaching the chuck area until a new fiber had been sensed in the fiber end supporting area.

Figure 19:
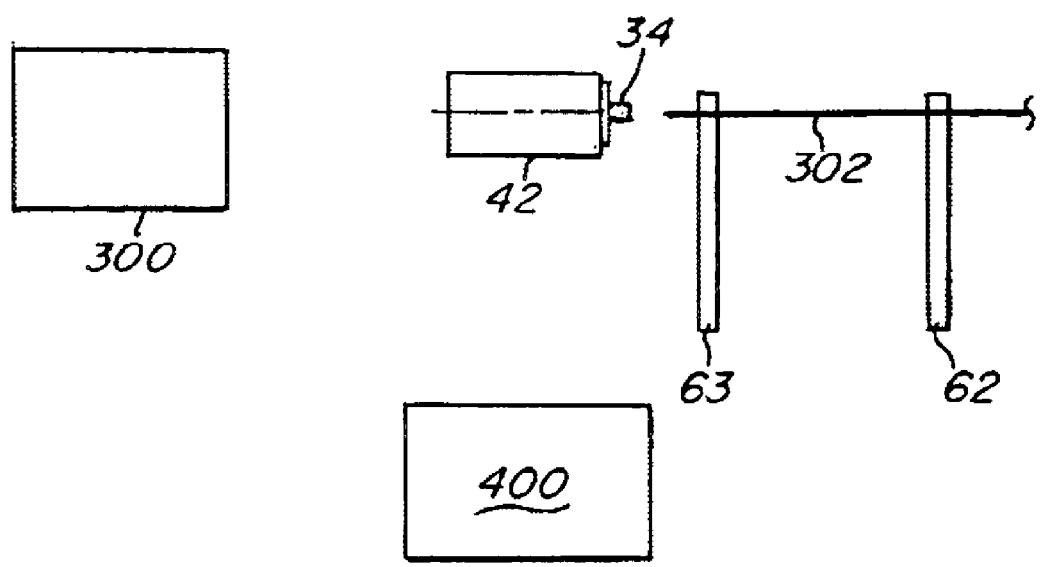
FIG. 19 is a schematic view of a ferrule attachment station for mounting a connector to a polarization maintaining fiber according to one illustrative embodiment of the invention.

The ferrule attachment station may be arranged to mount a connector, such as a ferrule, to a polarization maintaining fiber. As shown schematically in FIG. 19, a detector 300 is provided to determine the alignment of the polarization maintaining axis of the fiber 302. While the invention is not limited to a particular device for determining the alignment, it is contemplated that passive, active and POL devices should be suitable as would be apparent to one of skill in the art. The collet 42 is then manipulated to orient the ferrule 34 in a position that corresponds to the alignment of the polarization maintaining axis of the fiber. The ferrule may be keyed to facilitate adjustment to the desired mounting position. The detector communicates with the system controller 400 which then instructs the drive system to move the collet, such as by rotating, until the ferrule is in the desired orientation for mounting to the PM fiber. The collet may be rotatable at least 180 degrees to ensure proper matching of the ferrule to the alignment of the polarization maintaining axis of the fiber.

An automated method of assembling a connector, such as a ferrule, to a fiber, such as an optical fiber also is provided. The method, under computer control, includes a step of automatically positioning an adhesive filled ferrule relative to an end of a fiber, and then moving the ferrule over the fiber end and, where desired, rotating the ferrule either as the ferrule is plunged over the fiber end or after the ferrule is mounted about the fiber end. The method may also include the step of checking the orientation of the ferrule and then, if desired, reorienting the ferrule prior to mounting on the fiber end. Reorienting the ferrule may involve turning the ferrule 180 degrees about an axis perpendicular to a lengthwise axis of the ferrule (reversing end-to-end orientation), as well as rotating the ferrule about its lengthwise axis to change the position of the fiber through hole where it is offset of center. The ferrule also may be rotated to correspond the ferrule to an alignment of a polarization axis of the fiber. Where the ferrule has not been pre-loaded with an adhesive, the method also may include the step of dispensing an adhesive into the ferrule. After the ferrule has been positioned about the end of the fiber, the method may also include the step of heating the adhesive. The automated method of assembling a ferrule to a fiber also may include the step of repositioning the ferrule connected fiber in a tray with the pigtail supported within the tray rather than hanging off the edge of the tray. The automated method of assembling a ferrule to a fiber may include any one of the foregoing steps, a combination of two or more of the foregoing steps, or all of the foregoing steps. The sequence in which the automated method steps has been described may be varied as should be apparent to one of skill in the art.

While the invention has been described in conjunction with specific embodiments thereof, many alternatives, modifications, and variations will be apparent to those skilled in the art. Accordingly, embodiments as set forth herein are intended to be illustrative of the various aspects of the invention, not limiting. Various changes may be made without departing from the spirit and scope of the invention.

What is claimed is:

1. An automated station for attaching a connector to a portion of a fiber, the station comprising:
    a carrier for supporting the connector that, responsive to a control signal, is moveable in at least two axial directions and is rotatable; and
    a support for holding the fiber so that the fiber portion is available to receive the connector.

2. The automated station recited in claim 1 wherein said carrier moves in at least three axial directions.

3. The automated station recited in claim 1 including a linear drive system for moving said carrier in said at least two axial directions.

4. The automated station recited in claim 1 wherein said station includes a connector mounting path that passes through said fiber holding support, and wherein said carrier is moveable along said connector mounting path.

5. The automated station recited in claim 4 wherein said fiber holding support, responsive to a control signal, releases the fiber as said carrier moves a predetermined distance along said connector mounting path.

6. The automated station recited in claim 1 further including a connector supply, an adhesive dispenser, and a heater, said connector carrier being moveable, responsive to a control signal, adjacent to each of said connector supply, said adhesive dispenser and said heater.

7. The automated station recited in claim 1 wherein said carrier is rotatable at least 180 degrees.

8. The automated station recited in claim 1 wherein said fiber support is stationary.

9. The automated station recited in claim 1 further including an orienter system that, responsive to a control signal, changes an end-to-end orientation of the connector.

10. The automated station recited in claim 9 further including a chuck for supporting the connector, said chuck being moveable responsive to a control signal to change the end-to-end orientation of the connector.

11. The automated station recited in claim 1 further including a detector for determining at least one of an end-to-end orientation of the connector, an orientation of a fiber through hole in the connector, and an alignment of a polarization maintaining axis of the fiber.

12. The automated station recited in claim 11 including at least one of a chuck that is rotatable, responsive to a control signal, to change an end-to-end orientation of the connector, a collet that is rotatable to change the position of an offset fiber through hole in the connector, and a collet that is rotatable to place the connector in a position that corresponds with an alignment of a polarization maintaining axis of the fiber.

13. The automated station recited in claim 1 further including a delivery system for supplying a connector to said carrier.

14. The automated station recited in claim 13 wherein said delivery system includes an escapement, a loader and a chuck.

15. The automated station recited in claim 1 further including a receiving area for a tray that supports the fiber, wherein said fiber support is located adjacent said tray receiving area.

16. The automated station recited in claim 1 wherein said carrier is a collet.

17. The automated station recited in claim 1 being in communication with a computer controller.

18. An automated station for attaching a connector to a portion of a fiber, the station comprising:
    a support for holding a fiber so that the fiber portion is available to receive the connector;
    a detector for determining an alignment of a polarization maintaining axis of the fiber; and
    a carrier for supporting the connector that, responsive to a control signal, orients the connector into a position that corresponds with the alignment of the polarization maintaining axis of the fiber.

19. The automated station recited in claim 18 wherein said detector assesses a position of stress members in the fiber.

20. The automated station recited in claim 18 wherein said carrier is rotatable responsive to a control signal.

21. The automated station recited in claim 18 wherein said carrier is moveable in at least two axial directions.

22. The automated station recited in claim 21 wherein said carrier is moveable in at least three axial directions.

23. The automated station recited in claim 18 wherein said carrier, responsive to a control signal, is moveable to mount the connector about the fiber portion in the position that corresponds with the alignment of the polarization maintaining axis of the fiber.

24. The automated station recited in claim 23 being in communication with a computer controller.

25. An automated station for attaching a connector to a portion of a fiber, the station comprising:
   a fiber portion working area;
   a support for holding the fiber so that the fiber portion extends into said fiber working area;
   a carrier for supporting the connector that, responsive to a control signal, is moveable in said fiber working area;
   a heater, responsive to a control signal, that directs heat into said fiber working area to at least pre-set an adhesive that has been included in the connector.

26. The automated station recited in claim 25 wherein said heater includes a hot air blower.

27. The automated station recited in claim 25 wherein said fiber support has a holding position and a release position, and responsive to a control signal, said fiber support moves into said release position when said heater, responsive to a control signal, shuts off.

28. The automated station recited in claim 25 in communication with a computer controller.

29. An automated station for attaching a connector to a portion of a fiber, the station comprising:
   a source for supplying a connector at a connector supply location;
   an adhesive dispenser for filling the connector with adhesive at an adhesive dispensing location;
   a support for holding the fiber so that the fiber portion is available for mounting by the connector;
   a heater for at least pre-setting the adhesive filled connector at a heating location; and
   a carrier that is adapted to support the connector and that is moveable, responsive to one or more control signals, to said connector supply location, said adhesive dispensing location and said heating location.

30. The automated station recited in claim 29 wherein said carrier is moveable from said connector supply location to said adhesive dispensing location, from said adhesive dispensing location to said heating location, and from said heating location to said connector supply location.

31. The automated station recited in claim 29 wherein said carrier is moveable in at least two axial directions.

32. The automated station recited in claim 31 wherein said carrier is moveable in at least three axial directions.

33. The automated station recited in claim 29 wherein said carrier is rotatable.

34. The automated station recited in claim 29 wherein said carrier is moveable to and along said fiber support location.

35. The automated station recited in claim 34 wherein said carrier is rotatable.

36. The automated station recited in claim 34 wherein said carrier is moveable in at least two axial directions.

37. The automated station recited in claim 36 wherein said carrier is reciprocatingly moveable along said fiber support location.

38. The automated station recited in claim 29 in communication with a computer controller.

39. An automated station for attaching a connector to a portion of a fiber, the station comprising:
   a receiving area for a tray that is adapted to hold the fiber in a manageable configuration with the fiber portion extending outwardly from the tray;
   a fiber gripper adapted to support the portion of the fiber and that is moveable, responsive to a control signal, within said receiving area;
   a hold down member, responsive to a control signal, that is moveable from a first position that holds the tray in said receiving area and a second position that releases the tray in said receiving area.

40. The automated station recited in claim 39 wherein said hold down member includes a clamp.

41. The automated station recited in claim 39 wherein said hold down member is in said first position when said fiber gripper is moved within said tray receiving area.

42. The automated station recited in claim 41 further including a carrier for the connector and a supply of connectors, wherein responsive to a control signal, said carrier is moveable to said connector supply when said fiber gripper is moved within said receiving area.

43. The automated station recited in claim 39 in communication with a computer controller.

44. An automated station for attaching a connector in a pre-determined orientation to a portion of a fiber, the station comprising:
   a carrier adapted to support the connector;
   a system for detecting a first orientation of the connector;
   a support adapted to hold the fiber so that the fiber portion is available to receive the connector;
   wherein said carrier, responsive to a control signal, is moveable to position the connector in the pre-determined orientation.

45. The automated station recited in claim 44 wherein said carrier is rotatable.

46. The automated station recited in claim 45 wherein said carrier is rotatable at least 180 degrees.

47. The automated station recited in claim 44 wherein said detector detects the position of a hole extending through an end of the connector.

48. The automated station recited in claim 44 wherein said detector is a visual system.

49. The automated station recited in claim 44 in communication with a computer controller.

50. An automated station for attaching a connector to a portion of a fiber, the station comprising:
   a support adapted to hold the fiber so that the fiber portion is available to receive the connector,
   a carrier adapted to support the connector that, responsive to a control signal, is moveable along the fiber portion in a path including said fiber support;
   wherein said fiber support, responsive to a control signal, moves out of said path of said carrier after said carrier has been moved a pre-determined length along said path.

51. The automated station recited in claim 50 wherein said fiber support includes a primary clamp and a secondary clamp.

52. The automated station recited in claim 51 wherein said secondary clamp is moveable, responsive to a control signal, out of said path of said carrier after said carrier has been moved a pre-determined length along said path.

53. The automated station recited in claim 52 wherein said primary clamp is not located within said path of said carrier.

54. The automated station recited in claim 51 in communication with a computer controller.

55. An automated station for attaching a connector to a portion of a fiber, the station comprising:
   means for supporting the connector that, responsive to a control signal, is moveable in at least two axial directions and is rotatable; and
   means for holding the fiber so that the fiber portion is available to receive the connector.

56. An automated station for attaching a connector to a portion of a fiber, the station comprising:

means for holding a fiber so that the fiber portion is available to receive the connector;

means for determining an alignment of a polarization maintaining axis of the fiber;

means for supporting the connector that, responsive to a control signal, orients the connector into a position that corresponds with the alignment of the polarization maintaining axis of the fiber.

57. An automated station for attaching a connector to a portion of a fiber, the station comprising:

a fiber portion working area;

means for holding the fiber so that the fiber portion extends into said fiber working area;

means for supporting the connector that, responsive to a control signal, is moveable in said fiber working area;

means, responsive to a control signal, that directs heat into said fiber working area to at least pre-set an adhesive that has been included in the connector.

58. An automated station for attaching a connector to a portion of a fiber, the station comprising:

a source for supplying a connector at a connector supply location;

an adhesive dispenser for filling the connector with adhesive at an adhesive dispensing location;

a support for holding the fiber so that the fiber portion is available for mounting by the connector;

a heater for at least pre-setting the adhesive filled connector at a heating location; and means for supporting the connector that is moveable, responsive to one or more control signals, to said connector supply location, said adhesive dispensing location and said heating location.

59. An automated station for attaching a connector to a portion of a fiber, the station comprising:

a receiving area for a tray that is adapted to hold the fiber in an organized configuration with the fiber portion extending outwardly from the tray;

means for supporting the portion of the fiber and that is moveable, responsive to a control signal, within said receiving area;

means for holding the tray in said receiving area that, responsive to a control signal, is moveable from a first position that holds the tray in said receiving area to a second position that releases the tray in said receiving area.

60. An automated station for attaching a connector in a pre-determined orientation to a portion of a fiber, the station comprising:

means for supporting the connector;

means for detecting a first orientation of the connector;

means for holding the fiber so that the fiber portion is available to receive the connector;

wherein said means for supporting the connector, responsive to a control signal, is moveable to position the connector in the pre-determined orientation.

61. An automated station for attaching a connector to a portion of a fiber, the station comprising:

means for holding the fiber so that the fiber portion is available to receive the connector;

means for supporting the connector that, responsive to a control signal, is moveable along the fiber portion in a path including said means for holding;

wherein said means for holding, responsive to a control signal, moves out of said path of said means for supporting after said means for supporting has been moved a pre-determined length along said path.

* * * * *

UNITED STATES PATENT AND TRADEMARK OFFICE
CERTIFICATE OF CORRECTION

PATENT NO. : 6,895,654 B2
DATED : May 24, 2005
INVENTOR(S) : Steven M. Strandberg et al.

It is certified that error appears in the above-identified patent and that said Letters Patent is hereby corrected as shown below:

Column 14,
Line 3, replace "and" with -- to --.
Line 12, replace "wherein" with -- wherein, --.
Line 42, replace "connector," with -- connector; --.

Signed and Sealed this

Thirtieth Day of August, 2005

JON W. DUDAS
*Director of the United States Patent and Trademark Office*